United States Patent
Elmali et al.

(10) Patent No.: US 12,526,608 B2
(45) Date of Patent: Jan. 13, 2026

(54) RELIABLE SPS CONFIGURATION FOR MBS

(71) Applicant: Nokia Technologies Oy, Espoo (FI)

(72) Inventors: Ugur Baran Elmali, Munich (DE); Volker Pauli, Munich (DE); Esa Mikael Malkamäki, Espoo (FI); Benoist Pierre Sebire, Tokyo (JP); David Navrátil, Espoo (FI)

(73) Assignee: Nokia Technologies, Espoo (FI)

( * ) Notice: Subject to any disclaimer, the term of this patent is extended or adjusted under 35 U.S.C. 154(b) by 329 days.

(21) Appl. No.: 18/548,651

(22) PCT Filed: Apr. 6, 2021

(86) PCT No.: PCT/EP2021/058911
§ 371 (c)(1),
(2) Date: Sep. 1, 2023

(87) PCT Pub. No.: WO2022/214160
PCT Pub. Date: Oct. 13, 2022

(65) Prior Publication Data
US 2024/0155311 A1 May 9, 2024

(51) Int. Cl.
*H04W 4/06* (2009.01)
*H04L 1/1812* (2023.01)
(Continued)

(52) U.S. Cl.
CPC ............ *H04W 4/06* (2013.01); *H04L 1/1812* (2013.01); *H04W 72/11* (2023.01); *H04W 72/12* (2013.01)

(58) Field of Classification Search
CPC .............................. H04W 4/06; H04L 1/1812
See application file for complete search history.

(56) References Cited

U.S. PATENT DOCUMENTS 10,912,102 B2  2/2021  Shi
11,153,060 B2 * 10/2021  Babaei ................ H04B 7/0632
(Continued)

FOREIGN PATENT DOCUMENTS

WO   2016/029352 A1   3/2016
WO   2020/063351 A1   4/2020
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Physical layer procedures for control (Release 16)", 3GPP TS 38.213, V16.4.0, Dec. 2020, pp. 1-181.

(Continued)

*Primary Examiner* — Kenny S Lin
(74) *Attorney, Agent, or Firm* — Lippes Mathias LLP

(57) ABSTRACT

Embodiments of the present disclosure relate to reliable SPS configuration for MBS. In the solution, a first device starts a first timer upon receiving, from a second device, configuration of a semi-persistent scheduling (SPS) for a multicast and broadcast service (MBS). Then if the first timer expires and there is no information received to activate corresponding SPS scheduled transmissions, the first device transmits to the second device a message indicating that the first device failed to receive the information. This solution allows reliable SPS configuration for MBS.

20 Claims, 5 Drawing Sheets

(51) Int. Cl.
*H04W 72/11* (2023.01)
*H04W 72/12* (2023.01)

(56) References Cited

U.S. PATENT DOCUMENTS

| | | | | |
|---|---|---|---|---|
| 2014/0204819 | A1* | 7/2014 | Ohta | H04W 52/0212 |
| | | | | 370/311 |
| 2017/0353273 | A1 | 12/2017 | Zhang et al. | |
| 2018/0242326 | A1 | 8/2018 | Aiba et al. | |
| 2019/0053211 | A1* | 2/2019 | Ying | H04W 72/044 |
| 2019/0174530 | A1* | 6/2019 | Kim | H04W 72/0446 |
| 2019/0394794 | A1 | 12/2019 | Mali et al. | |
| 2020/0259622 | A1 | 8/2020 | Cao et al. | |
| 2020/0322921 | A1 | 10/2020 | Zhou et al. | |
| 2021/0076409 | A1 | 3/2021 | Goto et al. | |
| 2021/0160879 | A1* | 5/2021 | Lin | H04W 72/0453 |
| 2021/0218503 | A1* | 7/2021 | Babaei | H04L 1/08 |
| 2023/0081792 | A1* | 3/2023 | Kim | H04L 1/1864 |
| | | | | 370/329 |

FOREIGN PATENT DOCUMENTS

| | | | | |
|---|---|---|---|---|
| WO | WO-2021031038 | A1 * | 2/2021 | H04W 72/04 |
| WO | 2022/151165 | A1 | 7/2022 | |
| WO | 2022/151212 | A1 | 7/2022 | |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"New Work Item on NR support of Multicast and Broadcast Services", 3GPP TSG RAN Meeting #86, RP-193248, Agenda Item: 9.1.2, Huawei, Dec. 9-12, 2019, 5 pages.

"FL summary#1 on improving reliability for MBS for RRC_CONNECTED UEs", 3GPP TSG RAN WG1 Meeting #104-e, R1-200xxxx, Agenda Item: 8.12.2, Huawei, Jan. 25-Feb. 5, 2021, 67 pages.

International Search Report and Written Opinion received for corresponding Patent Cooperation Treaty Application No. PCT/EP2021/058911, dated Jan. 5, 2022, 14 pages.

"Error recovery from SPS activation failure", 3GPP TSG RAN WG2 #67, R2-094491, Agenda Item: 6.7.2, ETRI, Aug. 24-28, 2009, pp. 1-4.

"Discussion on MBS reliability for RRC_CONNECTED UEs", 3GPP TSG-RAN-WG1 #104b-e, R1-2102552, Agenda Item: 8.12.2, Google Inc, Apr. 12-20, 2021, 4 pages.

"Remaining details of UE behavior for SL and UL SPS", 3GPP TSG RAN WG1 Meeting #87, R1-1611736, Agenda Item: 6.2.1.1.2, LG Electronics, Nov. 14-18, 2016, pp. 1-2.

"SPS enhancement for V2V", 3GPP TSG RAN WG1 Meeting #84bis, R1-162122, Agenda Item: 7.3.2.2.2, Huawei, Apr. 11-15, 2016, 6 pages.

* cited by examiner

RELIABLE SPS CONFIGURATION FOR MBS

RELATED APPLICATION

This application was originally filed as PCT Application No. PCT/EP2021/058911, filed on Apr. 6, 2021, of which is incorporated herein by reference in its entirety.

FIELD

Embodiments of the present disclosure generally relate to the field of telecommunication and in particular, to a method, a device, an apparatus and a computer readable storage medium for reliable semi-persistent scheduling (SPS) configuration for multicast and broadcast service (MBS).

BACKGROUND

As part of a work item description (WID) on the fifth generation (5G)/new radio (NR), 3rd generation partnership project (3GPP) is currently defining mechanisms for enabling delivery of multicast and/or broadcast traffic to a multitude of user equipments (UEs). One of the key aims of the WID is to define group scheduling mechanisms that enable the multicast and/or broadcast traffic to be scheduled using common data channel resources while maintaining maximum commonalities with the currently defined unicast scheduling and operation mechanisms.

Further, the option of semi-persistent scheduling (SPS), where not each transmission on a physical downlink shared channel (PDSCH) is scheduled individually by information transmitted on a corresponding physical downlink control channel (PDCCH), but a periodic pattern of resources is allocated—using one-time radio resource control (RRC) signaling followed by one-time PDCCH scheduling—for repeated use until further notice, is agreed to be supported for the UEs in radio resource control (RRC) CONNECTED mode as discussed in the 3GPP standard.

SUMMARY

In general, example embodiments of the present disclosure provide a solution for reliable SPS configuration for MBS.

In a first aspect, there is provided a first device. The first device comprises at least one processor; and at least one memory including computer program code; the at least one memory and the computer program code are configured to, with the at least one processor, cause the device to start a first timer upon receiving, from a second device, configuration of a semi-persistent scheduling (SPS) for a multicast and broadcast service (MBS); and if the first timer expires and there is no information received to activate corresponding SPS scheduled transmissions, transmit to the second device a message indicating that the first device failed to receive the information.

In a second aspect, there is provided a second device. The second device comprises at least one processor; and at least one memory including computer program code; the at least one memory and the computer program code are configured to, with the at least one processor, cause the device to receive, from a first device, a message indicating that the first device failed to receive information indicating to activate a semi-persistent scheduling (SPS) for a multicast and broadcast service (MBS); and in response to receiving the message, transmit, to the first device, at least one of the following: the information indicating to activate the SPS, the information indication to deactivate the SPS, and the information indicating to modify a configuration of the SPS.

In a third aspect, there is provided a method. The method comprises starting, at the first device, a first timer upon receiving, from a second device, configuration of a semi-persistent scheduling (SPS) for a multicast and broadcast service (MBS); and if the first timer expires and there is no information received to activate corresponding SPS scheduled transmissions, transmitting to the second device a message indicating that the first device failed to receive the information.

In a fourth aspect, there is provided a method. The method comprises: receiving, at the second device from a first device, a message indicating that the first device failed to receive information indicating to activate a semi-persistent scheduling (SPS) for a multicast and broadcast service (MBS); and in response to receiving the message, transmitting, to the first device, at least one of the following: the information indicating to activate the SPS, the information indication to deactivate the SPS, and the information indicating to modify a configuration of the SPS.

In a fifth aspect, there is provided a first apparatus. The first apparatus comprises means for starting, at the first apparatus, a first timer upon receiving, from a second apparatus, configuration of a semi-persistent scheduling (SPS) for a multicast and broadcast service (MBS); and means for if the first timer expires and there is no information received to activate corresponding SPS scheduled transmissions, transmitting to the second apparatus a message indicating that the first apparatus failed to receive the information.

In a sixth aspect, there is provided a second apparatus. The second apparatus comprises means for receiving, at the second apparatus from a first apparatus, a message indicating that the first apparatus failed to receive information indicating to activate a semi-persistent scheduling (SPS) for a multicast and broadcast service (MBS); and means for in response to receiving the message, transmitting, to the first apparatus, at least one of the following: the information indicating to activate the SPS, the information indication to deactivate the SPS, and the information indicating to modify a configuration of the SPS.

In a seventh aspect, there is provided a computer-readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
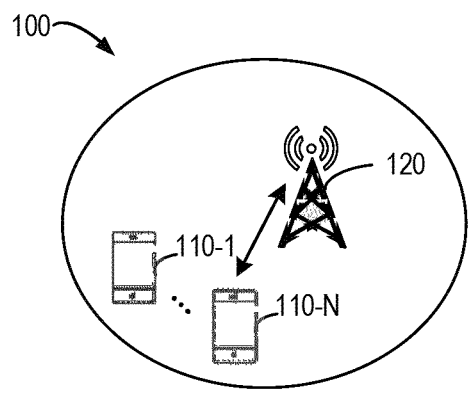
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), an integrated access and backhaul (IAB) node, a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

FIG. 1 illustrates an example communication environment 100 in which example embodiments of the present disclosure can be implemented. The communication environment 100, which may be a part of a communication network, includes a group of first devices 110-1 . . . 110-N (where N represents any suitable positive integer) (may also be referred to as terminal device) and a second device 120 (may also be referred to as network device). For the purpose of discussion, the first devices 110-1 . . . 110-N will be collectively or individually referred to as first device 110.

The communications between the first devices 110 and the second device 120 and between the first devices 110 via the second device 120 may follow any suitable communication standards or protocols, which are already in existence or to be developed in the future, such as universal mobile telecommunications system (UMTS), long term evolution (LTE), LTE-advanced (LTE-A), the fifth generation (5G) new radio (NR), wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), bluetooth, ZigBee, and machine type communication (MTC), enhanced mobile broadband (eMBB), massive machine type communication (mMTC), ultra-reliable low latency communication (URLLC), carrier aggregation (CA), dual connection (DC), and new radio unlicensed (NR-U) technologies.

In the communication environment 100, the second device 120 may transmit MBS traffic to the group of first devices 110-1 . . . 110-N on radio resources that are allocated semi-persistently (or semi-statically), dynamically or statistically. For example, the MBS traffic may be transmitted using SPS. In some example embodiments, the enabling, disabling or modification of an SPS configuration per BWP for the MBS traffic is indicated by the second device 120 to the first devices 110 so that the first devices 110 may perform the corresponding operations.

It should be understood that the second device 120 and the first device 110 are shown to be included in the communication environment 100 in FIG. 1 only for the purpose of illustration, without suggesting any limitation. In some example embodiments, the MBS traffic may be communicated between a plurality of first devices 110. Accordingly, the enabling, disabling or modification of an SPS configuration per BWP for the MBS traffic may be indicated from a transmitting first device 110 to a group of receiving first devices 110. It is also possible that the MBS traffic is transmitted and the corresponding SPS configuration is indicated from a relay to a group of first devices 110.

As mentioned above, 3GPP is currently defining mechanisms for enabling delivery of multicast and/or broadcast traffic to a multitude of UEs. The study on support of MBS in NR is ongoing. Further, point to multi-point (PTM) transmission is expected to efficiently provision MBS to multiple users by using the same radio framework as unicast transmission.

With respect to this, a primary objective is on strategies to achieve high efficiency and reliability to enable new use cases for PTM. To this end, it has been decided to support hybrid automatic repeat request (HARQ) for multicast delivery on the PDSCH. For example, acknowledgement (ACK)/negative acknowledgement (NACK) HARQ feedback on UE-specific physical uplink control channel (PUCCH) resources is agreed while NACK-only HARQ feedback on group-common PUCCH resources is still not yet agreed, as each scheme offers certain advantages in different scenario. For example, NACK-only is clearly preferable in scenarios with large audiences using the first devices 110 (e.g., UEs). At this point numerous details of both schemes are being studied/elaborated on.

NACK-only HARQ feedback means that numerous first devices 110 (e.g., UEs) use the same "group-common" PUCCH resources to send NACKs in case they did not succeed in decoding a PDSCH transmission of a PTM service. The second device 120 (e.g., a gNB) relies on plain energy detection to determine whether any first device 110 (e.g., a UE) has sent a NACK on the group-common feedback resource. One of the drawbacks of NACK-only feedback mode is that the second device 120 (e.g., a gNB) using energy detection on NACKs cannot distinguish whether the first devices 110 (e.g., UEs) have received the PDSCH transport block (TB) with error, or the first devices 110 (e.g., UEs) haven't successfully received the corresponding PDCCH that had scheduled the PDSCH. The latter error event is referred to as discontinuous transmission (DTX) error. In addition, the second device 120 (e.g., a gNB) cannot distinguish which first devices 110 (e.g., UEs) have sent NACK, since the uplink resource is a group-common resource. In case any NACK is detected on the group-common resource, the second device 120 (e.g., a gNB) may retransmit the PDSCH TB once again in a group-common or UE-specific manner.

Further, as mentioned above, one of the key aims is to define group scheduling mechanisms that enable the multicast/broadcast traffic to be scheduled using the common data channel resources—while maintaining maximum commonalities with the currently defined unicast scheduling and operation mechanisms. Furthermore, the option of SPS, where not each transmission on the PDSCH is scheduled individually by a corresponding PDCCH transmission, but a periodic pattern of resources is allocated via one-time RRC configuration and one-time activation via PDCCH for repeated use until further notice, is agreed to be supported for the first devices 110 (e.g., UEs) in RRC CONNECTED mode.

The reason why SPS is attractive for use of periodic traffic—or more generally any traffic that can be transmitted using a fairly persistent allocation of radio resources—is because it saves control signaling overhead in the form of PDCCH. In addition, once all the first devices 110 (e.g., UEs) receive the SPS activation successfully, SPS removes the problem of the first devices 110 (e.g., UEs) missing PDCCHs and inability to distinguish between ACK and DTX on the second device 120 (e.g., gNB) side.

Moreover, conventional unicast operation is performed with an SPS activation/deactivation (may also be referred to as SPS grant) procedure via PDCCH (with configured scheduling-radio network temporary identifier (CS-RNTI) and special configuration of the downlink control information (DCI) fields to identify it as an SPS activation/deactivation). ACK/NACK HARQ feedback on the assigned PUCCH resource(s) in response to the subsequent periodical PDSCH TB(s) sent by the first device 110 (e.g., UE) indicates to the gNB that first device 110 (e.g., UE) has successfully received the SPS grant. Thus, there is no explicit acknowledgement from the first device 110 (e.g., UE) that it received the SPS grant, but rather the second device 120 (e.g., a gNB) relies on the ACK/NACK feedback of the first devices 110 (e.g., UE) provided upon reception of subsequent PDSCH TB(s) that are transmitted in a periodic manner.

Meanwhile, in case of PTM and if the NACK-only scheme mentioned above is used as the HARQ feedback mechanism by the first device 110 (e.g., UE), as the gNB cannot distinguish between ACK and DTX, i.e., the first devices 110 (e.g., UEs) was not even aware of the PDSCH transmission as it failed to decode the corresponding PDCCH, at the first device 110 (e.g., UE), because in neither case does the first device 110 (e.g., UE) send HARQ feedback, and since the PUCCH resource where the HARQ feedback is provided is a group-common PUCCH resource, the gNB cannot understand whether a particular first device 110 (e.g., UE) has successfully received the SPS grant (activation/deactivation) or not.

Accordingly, a solution for improving the reliability transmission of the SPS activation/deactivation grant for the first devices 110 (e.g., UEs) receiving an MBS with an extremely large audience is needed when group-common NACK-only HARQ feedback scheme is used.

It is also noticed that a straightforward solution to improve the reliability of the SPS grant is to provide N blind transmissions (N−1 blind repetitions), where N is large enough to make probability of the first device 110 missing the SPS grant small (where the N−1 blind repetitions need to be aligned with the SPS pattern). The first devices 110 that have received the SPS grant on one of the earlier transmissions among N transmissions can simply ignore the subsequent repetitions. Alternatively, periodic repetition of the SPS grant at certain intervals (n×SPS periodicity where n>>1) might also be an option to increase reliability. However, in both cases, the second device 120 (e.g., gNB) would still be unaware of whether all the first devices 110 have successfully received the SPS grant or not.

In order to solve at least part of the above-mentioned problems, a solution for improving the reliability of the transmission of the SPS activation for the first device 110 is provided. In this solution, the first device 110 starts a timer upon receiving a configuration of an SPS for an MBS (e.g., via RRC signalling). Then, if no information is received to activate corresponding SPS until the first timer expires, the first device 110 transmits to the second device 120 a message indicating that the first device 110 failed to receive the information to activate corresponding SPS.

As such, a reliable transmission of SPS activation to the first device 110 is provided. Specifically, in case the first device 110 failed to receive information indicating to activate the SPS, it still has an opportunity to transmit the message mentioned above to the second device 120, such that the second device 120 is able to not only be aware of it and but also retransmit the information to the first device 110 again. In addition, this method requires only minimal uplink resources for confirmation that the SPS grant has been received by a very large number of UEs. That is, by using the first timer, only the first device 110 for which the first timer expires will need to transmit the message to the second device. Furthermore, this solution is also compatible with the straightforward solution which provides the information (SPS grant) multiple times as mentioned above.

Figure 2:
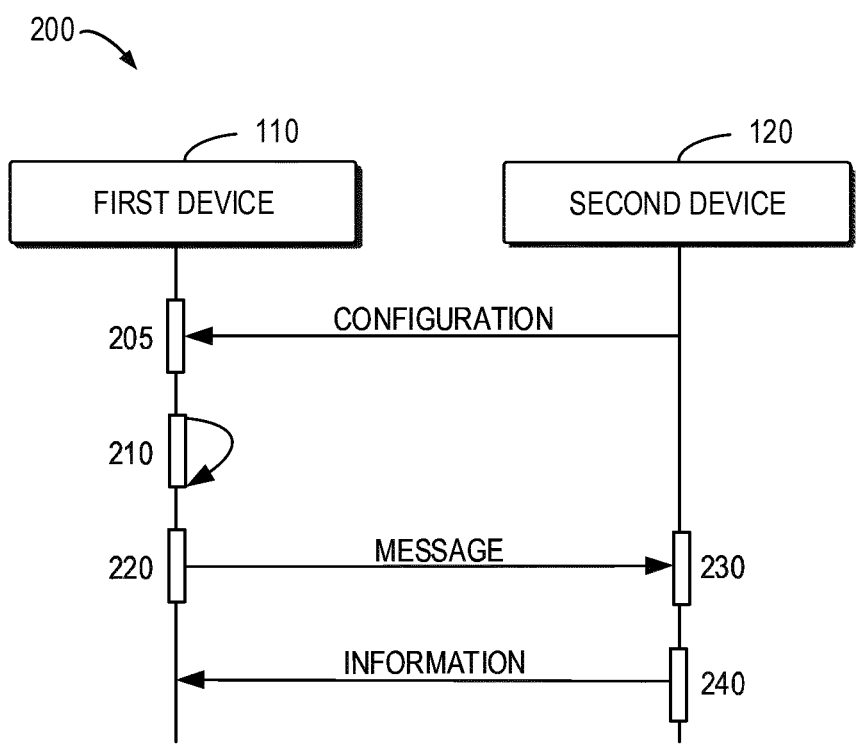
FIG. 2 illustrates a signaling flow for a reliable SPS configuration for MBS according to some embodiments of the present disclosure.

Example embodiments of the present disclosure will be described in detail below with reference to the accompanying drawings. Reference is now made to FIG. 2, which shows a signaling flow 200 for reliable SPS activation for MBS according to some example embodiments of the present disclosure. For the purpose of discussion, the signaling flow 200 will be described with reference to FIG. 1. The signaling flow 200 involves the first device 110 and the second device 120 as illustrated in FIG. 1.

As shown in the signalling flow 200, the first device 110 starts 210 the first timer upon receiving 205, from the second device 120, a configuration of an SPS for an MBS.

In some embodiments, the configuration of the SPS may also include other aspects such as SPS periodicity and PUCCH resource indicator for HARQ feedback. In some examples, the configuration may be broadcasted via system information block (SIB) or multicast control channel (MCCH) based or dedicated RRC signaling based mechanisms.

In some embodiments, the trigger of the transmission of the configuration may be the provision of a configuration of the SPS regardless of whether it is new or not. In one example, the configuration of the SPS may be a new configuration (e.g., the first device 110 did not have any SPS configuration with the same index before). In another example, if the configuration of the SPS is modified, the first device 110 may also be notified (either the first device 110 detects the modification in the SIB/MCCH, or the first device 110 in idle/inactive state are paged). In such example, the first device 110 may receive a modification to an already existing SPS configuration (e.g. SPS periodicity changes).

In some embodiments, upon transmitting the configuration of the SPS, the second device 120 (e.g., gNB) may further transmit information in the form of an SPS grant/activation, i.e., the remaining details needed by the first device 110 (e.g., UE) to receive the transmission on PDSCH such as modulation and coding scheme (MCS) and physical resource block (PRB) allocation as well as the timing of the SPS transmissions. In some examples, the transmission of the information may be repeated a few times (e.g., in the time grid of the SPS pattern) so as to increase the probability that the first device 110 (e.g., UE) receives the transmission on PDCCH.

In some examples, the SPS may be activated using DCI sent via PDCCH-scrambled using a group-common configured scheduling-radio network temporary identity (GS-RNTI), with the SPS configuration index value embedded within the DCI. Once the SPS is activated, the first device 110 may monitor PDSCH occasions with the configured periodicity and may require no further control signalling from the second device 120 (e.g., gNB) until the SPS configurations are modified or deactivated.

In some embodiments, when the first device 110 successfully received information indicating to activate the SPS, the first device 110 may stop the first timer and will not send any message/indication on the uplink. Further, the first device 110 may consider the possible retransmission of information indicating to activate the SPS required by other UEs receiving the same service as redundant.

However, in some examples, the first device 110 may fail to receive the information indicating to activate the SPS. For example, the first device 110 may fail to receive the message due to the network failures. Alternatively, the first device 110 may fail to receive the message because of other reasons and the scope of the present disclosure is not limited in this regard.

As such, if the first timer expires and there is no information received to activate corresponding SPS scheduled transmissions, the first device 110 transmits 220 to the second device 120 a message indicating that the first device 110 failed to receive the information. That is, if the first timer expires and the first device 110 has not received information indicating to activate the SPS, the first device 110 still has an opportunity to transmit to the second device 120 a message indicating that the first device 110 failed to receive the information. As a result, the second device 120 receiving the message is able to retransmit the information indicating to activate the SPS, thereby providing a reliable transmission of SPS activation to the first device 110.

Further, the solution mentioned above only requires minimal uplink resource for confirmation that the SPS grant has been received by a very large number of the first device 110. That is, only when the first timer expires, the first device will transmit the message to the second device. Furthermore, this solution is also compatible with the straightforward solution which provides SPS grant multiple times as mentioned above.

In such embodiments, for example, the first device 110 may restart the first timer upon transmission of the message. Accordingly, the first timer may start running again. Then, if the transmission of the message fails or if the first device 110 fails to receive the information indicating to activate the SPS again, and meanwhile the first timer expires again, another message may be transmitted to the second device 120 again, thus increasing reliability of activation of the SPS by the second device 120.

In some embodiments, the first device 110 may receive a configuration of a group-common uplink resource for a group of devices including the first device 110. For example, the group-common common uplink resource may be a common PUCCH resource or a common PRACH preamble. In such embodiments, the first device 110 may transmits to the second device 120 the message via the group-common uplink resource.

In some other embodiment, the first device 110 may also be configured (along with the SPS configuration) to include the message (e.g., in MAC-CE) inside a UE-specific uplink transmission. In such embodiments, the message may also be transmitted to the second device 120 via the UE-specific uplink resource/transmission.

Alternatively, the first device 110 may also be configured locally which way it will use to transmit the message. Accordingly, the first device 110 may transmit the message to the second device 120 based on the local configurations. The first device 110 may also transmit the message via other ways and the scope of the present disclosure is not limited in this regard.

In some embodiments, the first device 110 may receive an indication of duration of the first timer from the second device 120. Accordingly, the first device 110 may determine based on the indication that the first timer has expired. For example, the second device 120 may transmit a value of the first timer, and the first device 110 will determine the expiration of the first timer based on this value. In such embodiments, for example, the indication of the duration of the first timer may be transmitted to the first device 110 along with the configuration of the SPS mentioned above.

In some other embodiments, the first device 110 may also pre-configure the value of the first timer. Alternatively, the first device 110 may determine the expiration of the first timer using other ways and the scope of the present disclosure is not limited in this regard.

In some embodiments, the first device 110 may use a counter to count the number of transmissions of the message. In such embodiments, the first device 110 may increase the counter upon the transmission of the message. Then, if it is determined that the counter exceeds a threshold number, the first device may perform a random-access procedure for transmitting the message (e.g., via medium access control-control element (MAC CE)).

Further, the threshold number may be determined using a variety of ways. In one example, the threshold number may be determined based on an indication of a maximum number from the second device 120. In such example, for example, the second device 120 may directly transmit the threshold number to the second device 120.

In another example, the threshold number may be determined based on the maximum number of allowed hybrid automatic repeat request (HARQ) transmissions for a transport block of the MBS scheduled by the SPS. In such example, it may be that the first device 110 fails to receive the indication of the maximum number from the second device 120 or such field (i.e., the field carrying the indication) is not configured, then the first device 110 may determine the threshold number based on the maximum number of allowed hybrid automatic repeat request (HARQ) transmissions. That is, the first device 110 may assume the total number of HARQ retransmission for a PDSCH TB as the threshold number.

Alternatively, if a maximum number of transmissions of the same PDSCH TB is configured to the first device 110, the first device 110 may also assume that the threshold value herein to be this maximum number. It should be appreciated that, there may also be other ways for the first device 110 to determine the threshold number and the scope of the present disclosure is not limited in this regard.

Now returning back to FIG. 2. Accordingly, the second device 120 receives 230 from the first device 110 the message indicating that the first device 110 failed to receive information indicating to activate an SPS for an MBS. Upon receiving the message, the second device 120 transmits 240, to the first device 110, the information indicating to activate the SPS. As a result, a reliable transmission of SPS activation to the first device 110 is able to be provided.

Alternatively, upon receiving the message, the second device 120 may also transmit, to the first device 110 information indicating to deactivate the SPS. In another example, upon receiving the message, the second device 120 may transmit, to the first device 110 information to modify a configuration of the SPS.

As such, upon receiving the message, the second device 120 may determine by itself which information is appropriate to transmit to the first device 110. For example, if the second device 120 determines that other configuration of the SPS might be needed to be used at this point of time, it can transmit the information to modify the configuration of the SPS to the first device 110.

In some embodiments, upon reception of the message the first device 110, the second device 120 would retransmit the information indicating to activate the SPS in a variety of ways. In such embodiments, for example, the second device 120 may retransmit the information via a group-common downlink resource or UE-specific downlink resource. In some examples, if the second device 120 transmits a configuration of a group-common uplink resource for a group of devices comprising the first device 110, it may receive the message from the first device 110 via the group-common uplink resource and retransmit the information via a group-common downlink resource. Otherwise, in some other examples, the second device 120 may also transmit the information indicating to activate the SPS to the first device 110 via a UE-specific downlink resource (e.g., if the first device 110 transmitted the message to the second device 120 via the UE-specific uplink resource). It should be appreciated that the examples herein are only for the purpose of illustration and the scope of the present disclosure is not limited in this regard.

A detailed example process related to the first timer and the activation of the SPS will also be illustrated with reference to FIG. 3 in a latter part. In the above part, the process related to activation of the SPS for the MBS is introduced. In the following part, processes related to deactivation of the SPS will be illustrated.

In some embodiments, the second device (e.g., gNB) may transmit information indicating to deactivate the SPS. For example, the second device 120 may transmit a corresponding DCI on the group-common PDCCH. Subsequently, the second device 120 may keep the group-common NACK-only HARQ feedback PUCCH resources reserved. On the other hand, the PDSCH that were previously SPS scheduled may be immediately utilized for other purposes.

In some embodiments, upon receiving the information indicating to deactivate the SPS (e.g., via the corresponding DCI), the first device 110 may stop trying to decode PDSCHs on the previously allocated resources and stop sending NACKs. On the other hand, if the first device 110 hasn't received the deactivation DCI successfully it may still transmit NACKs because it is still expecting data transmissions on the SPS PDSCH occasions but isn't able to decode any data.

In some other embodiments, for a configured period of time, the second device 120 may keep listening on the group-common NACK-only HARQ feedback PUCCH resources to see if there is any first device 110 still transmitting NACKs. If the second device 120 detects any NACK transmissions, it may retransmit the information indicating to deactivate the SPS (e.g., SPS deactivation). In such embodiments, upon retransmitting the message, the second device 120 may keep listening on the group-common NACK-only HARQ feedback PUCCH resource once again. In some example, an upper limit on how many times the SPS deactivation may be retransmitted may be based on the second device 120's implementation.

Alternatively, if the second device 120 does not receive any NACKs within the configured period of time, it may assume that all the first devices 110 received the SPS deactivation successfully, and it may reallocate the group-common PUCCH resources for other purposes.

In some embodiments, a second timer may be configured at the first device 110 for MBS. The second timer may allow reliable re-activation of the SPS service with a certain frequency. In the following part, solutions related to the second timer will be introduced according to some embodiments of the present disclosure.

In some example embodiments, the second timer may be configured along with the configuration of the SPS, that is, the configuration of the second timer may be transmitted from the second device 120 to the first device 110 together with the configuration of the SPS mentioned above. Alternatively, the second timer may also be configured separately and the scope of the present disclosure is not limited in this regard.

In case such second timer is configured, for example, if it is determined that the SPS for the MBS is deactivated, the first device 110 may start the second timer for the SPS. In some other embodiments, the first device 110 may stop this second timer if the first device 110 receives information indicating to activate the SPS (e.g., SPS activation) for the corresponding MBS after the deactivation.

However, in some embodiments, if the second timer expires and the first device 110 still hasn't received the information indicating to activate the SPS, the first device 110 may transmit the message to the second device 120.

Accordingly, if the second device 120 has transmitted a re-activation, but the first device 110 has not received that successfully, the second device 120 may retransmit the activation based on this message by the first device 110. As such, reliable "frequent" re-activation of the SPS is achieved.

In such embodiments, for example, the first device 110 may also restart the second timer after transmitting the message. As such, the second timer starts running again and performs as mentioned above. As a result, if the transmission of the message fails or if the first device 110 fails to receive the information to (re)activate the SPS again, and meanwhile the second timer expires again, another message may be transmitted to the second device 120 again, thus increasing reliability of reactivation of the SPS by the second device 120.

In some embodiments, the first device 110 may increase a counter upon the transmission of the message indicating that the first device 110 failed to receive the information. If it is determined that the counter exceeds a threshold number, the first device 110 may reset the second timer and perform a random-access procedure for transmitting the message. In one example, the threshold number may be configured by the second device.

Further, the first device 110 may determine that the SPS for the MBS is deactivated in multiple ways. In some examples, the first device 110 may receive information indicating to deactivate SPS from the second device 120. Accordingly, the first device 110 may determine that the SPS for the MBS is deactivated. In some other examples, the first device 110 may determine the SPS for the MBS is deactivated based on a third timer. In such examples, the first device 110 may stop transmitting NACKs based on the third timer, the details of which will be introduced in the following part.

Alternatively, the first device 110 may also determine whether the SPS is deactivated based on a counter. In such embodiments, for example, the first device 110 may decrement the counter every time when the first device 110 does not correctly decode a TB of the MBS scheduled by the SPS. When the counter reaches zero, the first device 110 may assume that the SPS is deactivated and stops transmitting NACKs.

In another example, the first device 110 may also increase the counter from zero every time when the first device 110 does not correctly decode a TB of the MBS scheduled by the SPS. In such example, when the counter reaches an allowed maximum value, the first device 110 may assume that the SPS is deactivated and stops transmitting NACKs. It should be appreciated that the first device 110 may also determine whether the SPS is deactivated based on a counter in other ways and the protection scope of the present disclosure is not limited in this regard.

In some examples, the first device 110 may reset the counter every time it decodes TB of the MBS scheduled by the SPS correctly. It should be appreciated that the first device 110 may also determine whether the SPS for the MBS is deactivated in other ways and the scope of the present disclosure is not limited in this regard.

In some embodiments, the first device 110 may receive an indication of duration of the second timer from the second device 120. Accordingly, the first device 110 may determine based on the indication that the second timer has expired. For example, the second device 120 may transmit a value of the second timer, and the first device 110 will determine the expiration of the second timer based on this value. In such embodiments, for example, the indication of the duration of the second timer may be transmitted to the first device 110 along with the configuration of the SPS mentioned above.

In some other embodiments, the first device 110 may also pre-configure the value of the second timer. Alternatively, the first device 110 may determine the expiration of the second timer using other ways and the scope of the present disclosure is not limited in this regard.

In the above part, the second timer is introduced along with the SPS deactivation and reactivation process according to some embodiments of the present disclosure. In the following part, the third timer that may be used in the process of SPS deactivation will be illustrated below according to some embodiments of the present disclosure.

In some embodiments, the first device 110 may also be configured with the third timer. In such embodiments, if a TB of the MBS scheduled by the corresponding SPS after the SPS has been activated is received (i.e., upon (every) successfully decoding of an SPS PDSCH), the first device 110 may (re-)start the third timer.

If the third timer expires, the first device 110 may determine that the SPS for the MBS is deactivated. That is, the expiration of the third timer may reflect the fact that the UE has not successfully decoded any PDSCH transmission in an extended period. Accordingly, upon the expiration of the third timer, the first device 110 may assume the SPS for the MBS is deactivated. In such case, the first device 110 may also stop transmitting NACKs.

With the above embodiments, in case where the second device 120 transmits information indicating to deactivate the SPS for the MBS but the first device 110 fails to receive such message, the first device 110 may determine the SPS has been deactivated and stop transmitting NACKs. A detailed example process related to the second and third timer and the deactivation of the SPS will also be illustrated with reference to FIGS. 4-5 in a latter part.

In some embodiments, the first device 110 may receive an indication of duration of the third timer from the second device 120. Accordingly, the first device 110 may determine based on the indication that the third timer has expired. For example, the second device 120 may transmit a value of the third timer, and the first device 110 will determine the expiration of the third timer based on this value. In such embodiments, for example, the indication of the duration of the third timer may be transmitted to the first device 110 along with the configuration of the SPS mentioned above.

In some other embodiments, the first device 110 may also pre-configure the value of the third timer. Alternatively, the first device 110 may determine the expiration of the third timer using other ways and the scope of the present disclosure is not limited in this regard.

In the above parts, three timers (i.e., the first timer, second timer and third timer) are introduced along with the activation/deactivation/reactivation process of the SPS for the MBS. In the following part, solutions related to the restart of the first timer will be introduced. In such solutions, the first device 110 may not completely stop the first timer upon reception of the information indicating to activate/deactivate/PDSCH the SPS.

In some embodiment, the first device 110 may restart the first timer upon a receipt of the information indicating to activate the SPS. In some other embodiments, the first device 110 may restart the first timer when it receives information indicating to deactivate the SPS. Alternatively, the first device 110 may also restart the first timer in response to a receipt of a TB whose transmission was scheduled according to the SPS. Accordingly, the first timer being restarted will start running from a configured start value and perform as mentioned in the above part. For example, if the first timer expires, the first device 110 may transmit a message indicating that the first device 110 failed to receive the information to activate the SPS and may then restart the timer.

In this way, if the second device 120 has sent a re-activation, but the first device 110 has not received that successfully, the second device 120 may retransmit the activation, thereby providing a reliable "frequent" re-activation of the SPS service. Further, an example process related to the restart of the first timer will be introduced with reference to FIG. 6 in a latter part.

In the following part, more details examples process about activation and/or deactivation of the SPS will be provided with reference to FIGS. 3-6. It should be appreciated that example embodiments provided with reference to FIGS. 3-6 are provided only for the purpose of illustration, rather than limiting the scope of the present disclosure.

Figure 3:
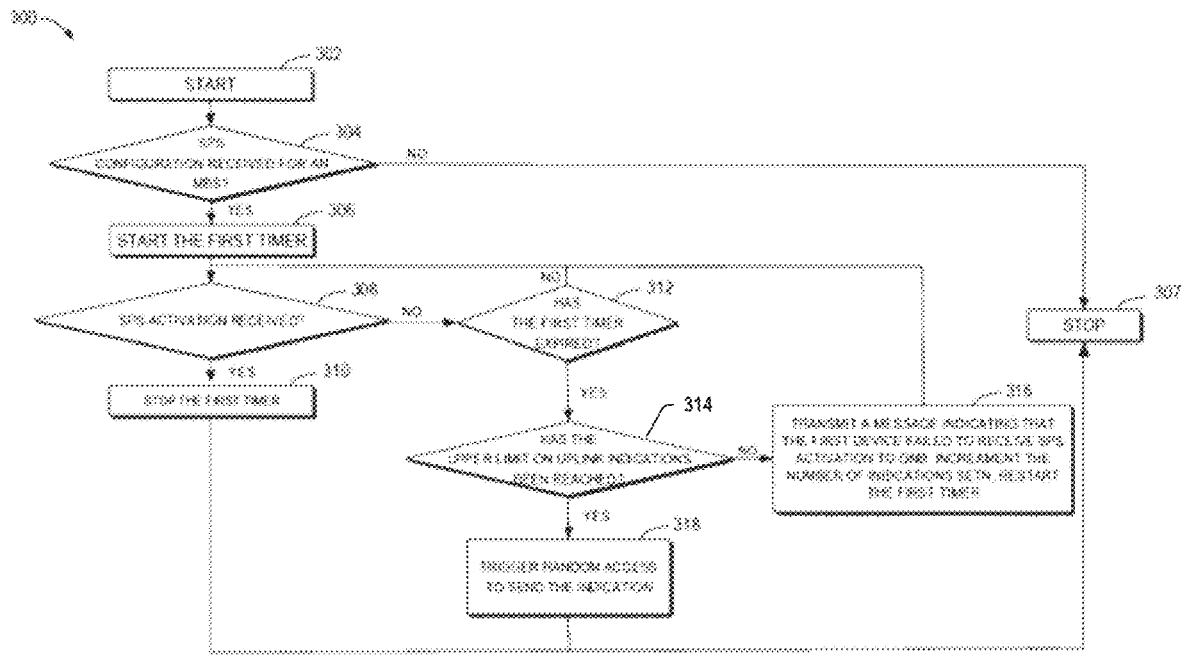
FIG. 3 illustrates an example process of SPS activation according to some example embodiments of the present disclosure.

FIG. 3 illustrates an example process 300 of SPS activation according to some example embodiments of the present disclosure. For the purpose of discussion, the process 300 will be described from the perspective of the first device 110 with reference to FIG. 1. It should be appreciated that there may also be other processes of SPS activation according to the embodiment of the present disclosure, and the example process 300 to be described below is shown only for the purpose of illustration, rather than limiting the scope of the present disclosure.

As shown in FIG. 3, the process 300 starts at block 302. At block 304, the first device 110 may determine whether an SPS configuration is received for an MBS. If it is determined that an SPS configuration is received for an MBS, at block 306, the first device 110 will start the first timer. If not, then the process 300 stops at block 307. It should be appreciated that, the process 300 may be initiated repeatedly until block 304 returns "YES" although not shown. That is, the process 300 may be 302→304→302→304→ . . . 302→304→306→308→ . . . .

In some embodiments, upon starting the first timer, at block 308 the first device 110 may determine whether information indicating to activate the SPS (e.g., SPS activation) has been received. If it is determined that the information indicating to activate the SPS has been received, the first device 110 may stop the first timer at block 310. After that, the process 300 will stop at block 307. Otherwise, if it is determined that the information indicating to activate the SPS has not been received, then process 300 proceeds to block 312 where the first device 110 may determine whether the first timer has expired.

If it is determined that the first timer has expired, the first device 110 may determine whether an upper limit on uplink indications (i.e., a threshold number for transmitting a message indicating that the first device 110 failed to receive the information) has been reached at block 314. For example, a counter may be used for counting the number of messages to request a retransmission of the SPS activation information. Otherwise, if the first timer has not expired, the process 300 proceeds back to the block 308 mentioned above.

At block 314, if it is determined that the upper limit/threshold number has not been reached, then at block 316, the first device 110 may transmit a message (e.g., a message indicating that the first device 110 failed to receive the information of an SPS activation retransmission) to the second device 120 to request retransmission of the SPS activation information. Further, the first device 110 may increase the counter upon the transmission of the message, that is, to increase the number of messages sent. In addition, the first device 110 may also restart the first timer upon the transmission of the message and go back to block 308.

Alternatively, in some embodiment, if it is determined that the upper limit/threshold number has been reached, then at block 318, the first device 110 may trigger a random-access procedure to transmit the message (e.g., via a MAC CE message). After that, the process 300 will stop at block 307.

Figure 4:
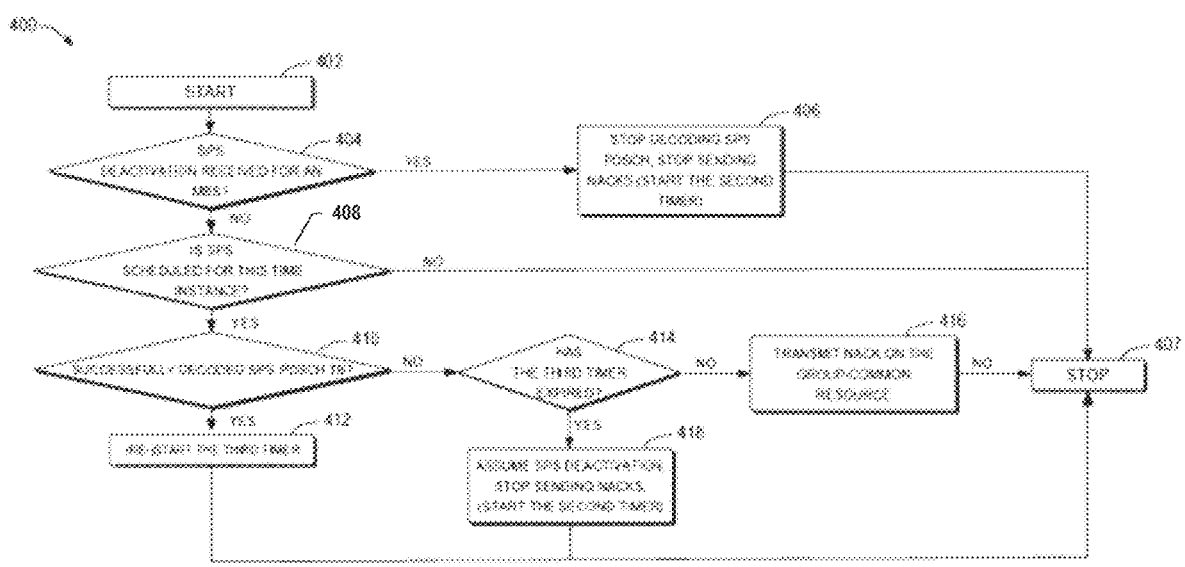
FIG. 4 illustrates an example process of SPS deactivation according to some example embodiments of the present disclosure.

FIG. 4 illustrates an example process 400 of SPS deactivation according to some example embodiments of the present disclosure. For the purpose of discussion, the process 400 will be described from the perspective of the first device 110 with reference to FIG. 1. It should be appreciated that the process 400 may be executed in every time slot in which there is a new opportunity for the first device 110 to receive an SPS deactivation. It should be appreciated that there may also be other processes of SPS deactivation according to the embodiment of the present disclosure, and the example process 400 to be described below is shown only for the purpose of illustration, rather than limiting the scope of the present disclosure.

As shown in FIG. 4, the process 400 starts at block 402. At block 404, the first device 110 may determine whether an SPS deactivation has been received for an MBS. In such case, for example, the first device 110 may have received information indicating to activate an SPS, thus an SPS for an MBS has been activated at the first device 110. As such, for example the first device 110 may monitor occasions on the downlink channel (e.g., PDSCH occasions) with a configured periodicity and may decode a PDSCH transmission of the MBS. In such case, if the first device 110 did not succeed in decoding a PDSCH transmission of the MBS, the first device 110 may transmit NACK by using the "group-common" PUCCH resource.

Then at this time, for example, the second device 120 may decide to deactivate the SPS for the MBS. Accordingly, the second device 120 may transmit information indicating to deactivate the SPS so that the first device 110 that receives this message may proceed to block 406. At block 406, the first device 110 may stop decoding SPS PDSCH (i.e., PDSCH transmission of the MBS scheduled by the SPS). Meanwhile, the first device 110 will also stop sending NACKs. At this block 406, the first device 110 may also start the second timer for other purpose. As the details of the second timer will be elaborate with reference to the next figure (i.e., FIG. 5), the details thereof will not be repeated here. After that, the process 400 stops at block 407.

In some embodiments, at the block 404, if it is determined that an SPS deactivation has not been received for an MBS, the first device 110 may determine whether there is as SPS scheduled for this instance at block 408. If it is determined that there is an SPS scheduled for this time instance, the process 400 will proceed to block 410, otherwise, the process 400 stops at block 407.

At block 408, the first device 110 may determine whether there is a reception of a transport block (TB) of the MBS scheduled by the corresponding SPS after the SPS has been activated, that is, whether the first device 110 successfully receive the transport block. If yes, the first device 110 may start a third timer at block 412. After that, the process 400 will stop at block 407. Otherwise, if it is determined at the block 410 that the first device 110 fails to successfully receive a transport block, the process 400 will proceed to block 414.

In some embodiments, at block 414, the first device 110 determines whether the third timer expired. In case the third timer has not expired, at block 416, the first device 110 may transmit NACK on the group-common resource. Otherwise, in a scenario that the third time expires, at block 418, the first device 110 may assume SPS deactivation and stop sending NACKs. In some example, in such embodiments, the first device 110 may also start the second timer mentioned above and the details of which will be elaborated in the next figure (i.e., FIG. 5). Subsequently, the process 400 stops at block 407.

As such, even if the first device 110 fails to receive information indicating to deactivate the SPS, the SPS may be deactivated upon the expiration of the timer. As a result, the first device 110 does not need to keep on monitoring the PDSCH transmission and transmitting NACKs, thereby saving the processing resource of the first device.

Figure 5:
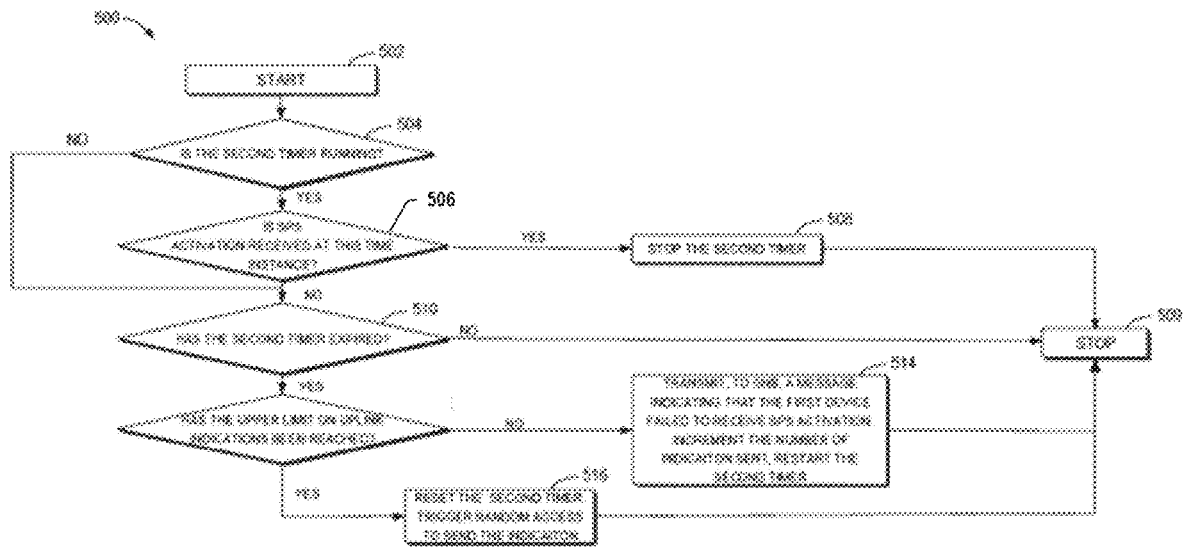
FIG. 5 illustrates an example process of SPS deactivation according to some example embodiments of the present disclosure.

FIG. 5 illustrates an example process 500 of SPS deactivation according to some example embodiments of the present disclosure. For the purpose of discussion, the process 500 will be described from the perspective of the first device 110 with reference to FIG. 1. It should be appreciated that there may also be other processes of SPS deactivation according to the embodiment of the present disclosure, and the example process 500 to be described below is shown only for the purpose of illustration, rather than limiting the scope of the present disclosure.

The process 500 that is shown in FIG. 5 starts at block 502. At block 504, the first device 110 may determine whether the second timer is running or not. As mentioned above, in some example, the second timer may be started at block 406 upon SPS deactivation received for an MBS. Alternatively, the second timer may also be started at block 418 mentioned above upon the expiration of the third timer.

If it is determined that the second timer is running, at block 506, the first device 110 may determine whether the SPS activation is received at this time instance or not. If the SPS activation is not received, the process 500 will go to block 510. In some examples, when the first device 110 determines that the information indicating to activate the SPS (e.g., SPS activation) is received at this time instance, the first device 110 may stop the second timer at block 508 and the process 500 stops at block 509. It should be appreciated that, the process 500 may be initiated repeatedly until block 506 or 512 (to be discussed later) returns "YES" although not shown.

Alternatively, if there is no SPS activation received at this time instance, the process 500 proceed to block 510 and the first device 110 determines at the block 510 whether the second timer expired. In case that the second timer has not expired, the process 500 stops at block 509. Otherwise, if the second timer has not expired, the first device 110 may further determine whether an upper limit on uplink indications (i.e., a threshold number for transmitting the message indicating that the first device 110 failed to receive the information) has been reached at block 512. If yes, the first device 110 may reset the second timer. Furthermore, the first device 110 may also restart the second timer at block 516 and trigger random access to send the message. Otherwise, the process 500 may proceed to block 514.

In some examples, at block 514, the first device 110 may transmit a message (e.g., the message indicating that the first device 110 failed to receive the information) to the second device 120 to retransmit the SPS activation. Further, the first device 110 may increase/increment the number of messages, for example by using a counter that is increased upon the transmission of the messages. After that, the process 500 stops at block 509.

Figure 6:
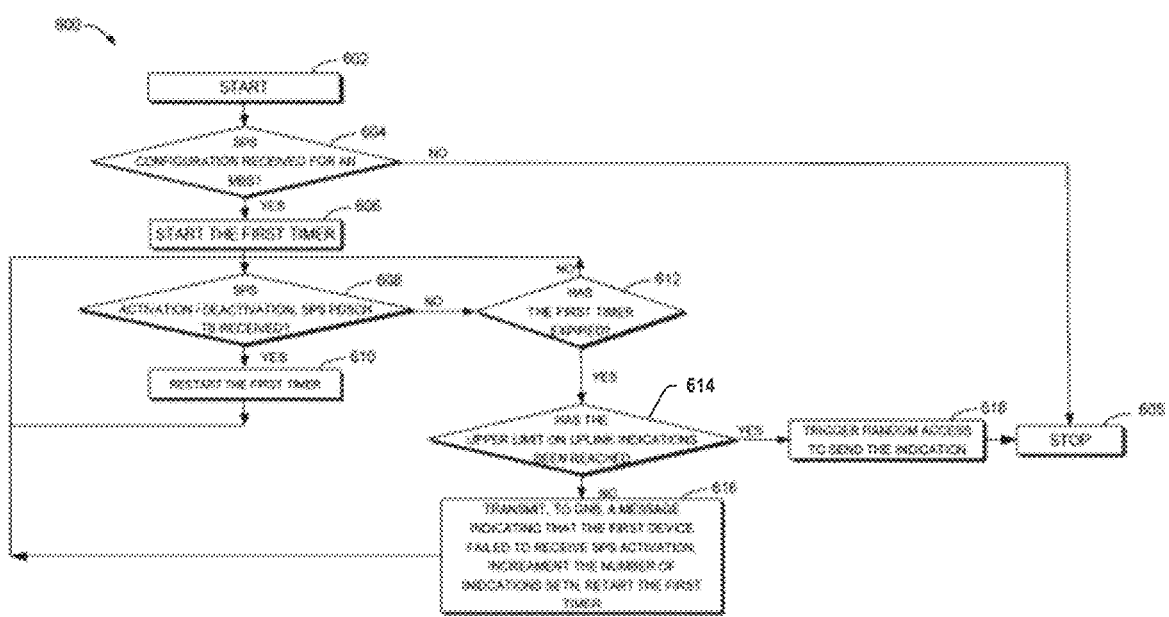
FIG. 6 illustrates an example process of SPS activation/deactivation according to some example embodiments of the present disclosure.

FIG. 6 illustrates an example process 600 of SPS activation/deactivation according to some example embodiments of the present disclosure. For the purpose of discussion, the process 600 will be described from the perspective of the first device 110 with reference to FIG. 1. It should be appreciated that there may also be other processes of SPS activation/deactivation according to the embodiment of the present disclosure, and the example process 600 to be described below is shown only for the purpose of illustration, rather than limiting the scope of the present disclosure.

As shown in FIG. 6, the process 600 starts at block 602. Then, at block 604, the first device 110 may determine whether an SPS configuration is received for an MBS. If it is determined that an SPS configuration is received for an MBS, at block 606, the first device 110 will start the first timer. If not, then the process 600 stops at block 605.

Upon starting the first timer, at block 608, the first device 110 may determine whether information indicating to activate an SPS (i.e., SPS activation)/deactivate an SPS (i.e., SPS deactivation)/TB of the MBS scheduled by the SPS (e.g., SPS PDSCH TB) is received. If yes, in some embodiments, the first device 110 may restart the first timer at block 610. Otherwise, the process 600 proceeds to block 612.

At block 612, the first device 110 may determine whether the first timer has expired. Upon the expiration of the first timer, the first device 110 will proceed to block 614, and then blocks 616 and 618. Blocks 614, 616 and 618 in process 600 are similar to those has been described in blocks 314, 316 and 318, respectively, thus the details thereof will not be repeated here. It should be appreciated that, the process 600 may be initiated repeatedly until block 614 returns "YES" although not shown.

Figure 7:
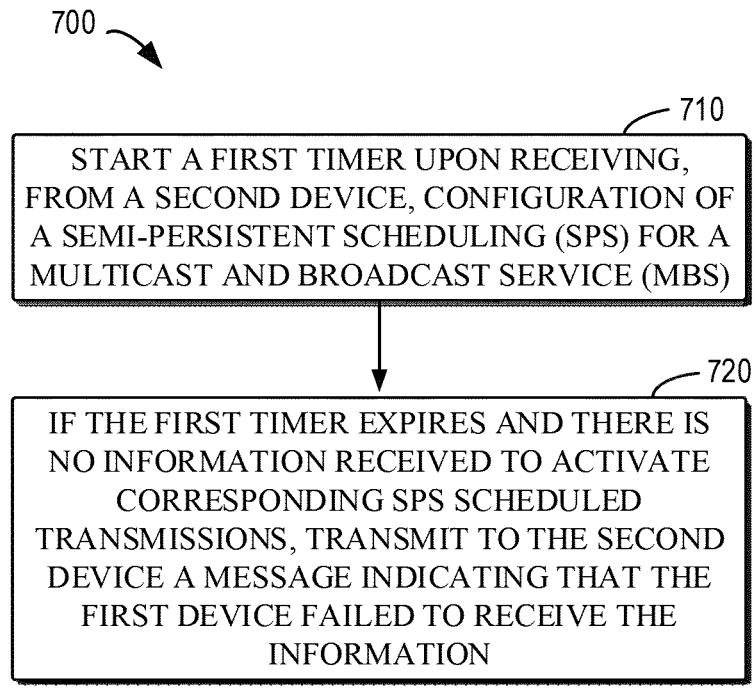
FIG. 7 illustrates a flowchart of a method implemented at the first device according to some embodiments of the present disclosure.

FIG. 7 illustrates a flowchart of a method 700 implemented at the first device 110 according to some embodiments of the present disclosure. For the purpose of discussion, the method 700 will be described from the perspective of the first device 110 with reference to FIG. 1.

At block 710, the first device 110 starts a first timer upon receiving, from a second device 120, configuration of a semi-persistent scheduling (SPS) for a multicast and broadcast service (MBS). At block 720, if the first timer expires and there is no information received to activate corresponding SPS scheduled transmissions, the first device 110 transmits to the second device 120 a message indicating that the first device 110 failed to receive the information.

In some embodiments, first device 110 may restart the first timer upon the transmission of the message.

In some embodiments, the first device 110 may receive a configuration of a group-common uplink resource for a group of devices comprising the first device 110; and transmit the message to the second device 120 via the group-common uplink resource.

In some embodiments, the message is transmitted to the second device 120 via a user equipment-specific uplink resource.

In some embodiments, the first device 110 may further increase a counter upon the transmission of the message; and in accordance with a determination that the counter exceeds a threshold number, perform a random-access procedure for transmitting the message.

In some embodiments, the threshold number may be determined based on at least one of the following: an indication of a maximum number from the second device 120, or the maximum number of allowed hybrid automatic repeat request, HARQ, transmissions for a transport block of the MBS scheduled by the SPS.

In some embodiments, the first device 110 may in response to receiving the information indicating to activate the SPS, stop the first timer.

In some embodiments, the first device 110 may further restart the first timer based on at least one of the following: a receipt of the information indicating to activate the SPS, a receipt of the information indicating to deactivate the SPS, or a receipt of a transport block whose transmission was scheduled according to the SPS.

In some embodiments, the first device 110 may receive an indication of a duration of the first timer from the second device 120.

In some embodiments, the first device 110 may in response to determining that the SPS for the MBS is deactivated, start a second timer; and in response to an expiration of the second timer without receiving the information indicating to activate the SPS, transmit the message to the second device 120.

In some embodiments, the first device 110 may restart the second timer upon the transmission of the message.

In some embodiments, the first device 110 may increase a counter upon the transmission of the message; and in accordance with a determination that the counter exceeds a threshold number, reset the second timer and perform a random-access procedure for transmitting the message.

In some embodiments, the threshold number is configured by the second device 120.

In some embodiments, the first device 110 may further in response to a receipt of a transport block of the MBS scheduled by the corresponding SPS after the SPS has been activated, start a third timer; and in response to an expiration of the third timer, determine that the SPS for the MBS is deactivated.

In some embodiments, the first device 110 may further receive, from the second device 120, a further message comprising at least one of: an indication of a duration of the second timer, and an indication of a duration of the third timer.

Figure 8:
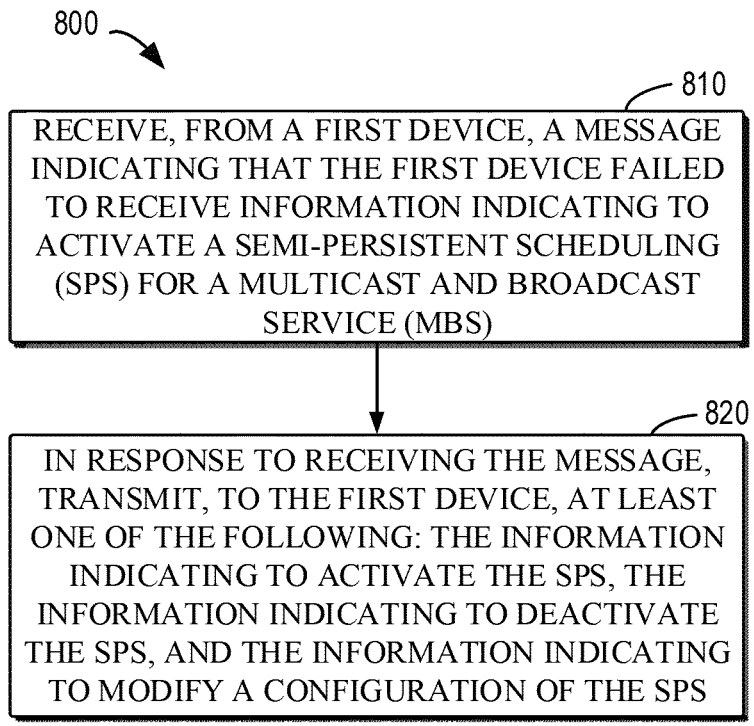
FIG. 8 illustrates a flowchart of a method implemented at the second device according to some embodiments of the present disclosure.

FIG. 8 illustrates a flowchart of a method 800 implemented at a second device 120 according to some embodiments of the present disclosure. For the purpose of discussion, the method 800 will be described from the perspective of the second device 120 with reference to FIG. 1.

At block 810, the second device 120 receives, from a first device 110, a message indicating that the first device 110 failed to receive information indicating to activate a semi-persistent scheduling (SPS) for a multicast and broadcast service (MBS). At block 820, the second device 120 in response to receiving the message, transmits, to the first device 110, at least one of the following: the information indicating to activate the SPS, the information indicating to deactivate the SPS, and the information indicating to modify a configuration of the SPS.

In some embodiments, the second device 120 may further transmit a configuration of a group-common uplink resource for a group of devices comprising the first device 110; and receive the message from the first device 110 via the group-common uplink resource.

In some embodiments, the message may be received from the first device 110 via a user equipment-specific uplink resource.

In some embodiments, the second device 120 may further transmit, to the first device 110, an indication of a maximum number of allowed transmissions of the message by the first device 110.

In some embodiments, the second device 120 may further transmit, to the first device 110, at least one of the following: an indication of a duration of a first timer for the SPS, an indication of a duration of a second timer for the SPS, and an indication of a duration of a third timer for the SPS.

In some embodiments, the first apparatus capable of performing any of the method 700 (for example, the first device 110) may comprise means for performing the respective steps of the method 700. The means may be implemented in any suitable form. For example, the means may be implemented in a circuitry or software module.

In some example embodiments, the first apparatus comprises: means for starting, at the first apparatus, a first timer upon receiving, from a second apparatus (e.g., the second device 120), configuration of a semi-persistent scheduling (SPS) for a multicast and broadcast service (MBS); and means for if the first timer expires and there is no information received to activate corresponding SPS scheduled transmissions, transmitting to the second apparatus a message indicating that the first apparatus failed to receive the information.

In some example embodiments, the first apparatus further comprises: means for restarting the first timer upon the transmission of the message.

In some example embodiments, the first apparatus further comprises: means for receiving a configuration of a group-common uplink resource for a group of devices comprising the first apparatus; and means for transmitting the message to the second apparatus via the group-common uplink resource.

In some example embodiments, the message is transmitted to the second apparatus via a user equipment-specific uplink resource.

In some example embodiments, the first apparatus further comprises: means for increasing a counter upon the transmission of the message; and means for in accordance with a determination that the counter exceeds a threshold number, perform a random-access procedure for transmitting the message.

In some example embodiments, the threshold number is determined based on at least one of the following: an indication of a maximum number from the second apparatus, or the maximum number of allowed hybrid automatic repeat request, HARQ, transmissions for a transport block of the MBS scheduled by the SPS.

In some example embodiments, the first apparatus further comprises: means for in response to receiving the information indicating to activate the SPS, stop the first timer.

In some example embodiments, the first apparatus further comprises: means for restarting the first timer based on at least one of the following: a receipt of the information indicating to activate the SPS, a receipt of the information indicating to deactivate the SPS, or a receipt of a transport block whose transmission was scheduled according to the SPS.

In some example embodiments, the first apparatus further comprises: means for receiving an indication of a duration of the first timer from the second apparatus.

In some example embodiments, the first apparatus further comprises: means for in response to determining that the SPS for the MBS is deactivated, start a second timer; and means for in response to an expiration of the second timer without receiving the information indicating to activate the SPS, transmit the message to the second apparatus.

In some example embodiments, the first apparatus further comprises: means for restarting the second timer upon the transmission of the message.

In some example embodiments, the first apparatus further comprises: means for increasing a counter upon the transmission of the message; and means for in accordance with a determination that the counter exceeds a threshold number, resetting the second timer and performing a random-access procedure for transmitting the message.

In some example embodiments, the threshold number is configured by the second apparatus.

In some example embodiments, the first apparatus further comprises: means for in response to a receipt of a transport block of the MBS scheduled by the corresponding SPS after the SPS has been activated, starting a third timer; and in response to an expiration of the third timer, determine that the SPS for the MBS is deactivated.

In some example embodiments, the first apparatus further comprises: means for receiving, from the second apparatus, a further message comprising at least one of: an indication of a duration of the second timer, and an indication of a duration of the third timer.

In some embodiments, the second apparatus capable of performing any of the method 800 (for example, the second device 120) may comprise means for performing the respective steps of the method 800. The means may be implemented in any suitable form. For example, the means may be implemented in a circuitry or software module.

In some embodiments, the second apparatus comprises: means for receiving, from a first device, a message indicating that the first apparatus failed to receive information indicating to activate a semi-persistent scheduling (SPS) for a multicast and broadcast service (MBS); and means for in response to receiving the message, transmitting, to the first apparatus, at least one of the following: the information indicating to activate the SPS, the information indication to deactivate the SPS, and the information indicating to modify a configuration of the SPS.

In some embodiments, the second apparatus further comprises: means for transmitting a configuration of a group-common uplink resource for a group of devices comprising the first apparatus; and means for receiving the message from the first apparatus via the group-common uplink resource.

In some embodiments, the message is received from the first apparatus via a user equipment-specific uplink resource.

In some embodiments, the second apparatus further comprises: means for transmitting, to the first apparatus, an indication of a maximum number of allowed transmissions of the message by the first apparatus.

In some embodiments, the second apparatus further comprises: means for transmitting, to the first apparatus, at least one of the following: an indication of a duration of a first timer for the SPS, an indication of a duration of a second timer for the SPS, and an indication of a duration of a third timer for the SPS.

Figure 9:
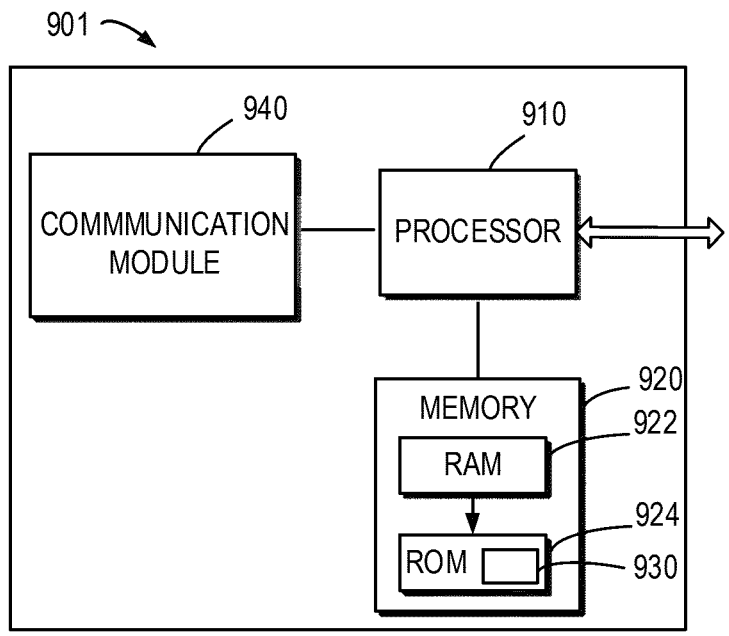
FIG. 9 illustrates a simplified block diagram of a device that is suitable for implementing example embodiments of the present disclosure.

FIG. 9 is a simplified block diagram of a device 900 that is suitable for implementing embodiments of the present disclosure. The device 900 may be provided to implement the communication device, for example the first device 110, the second device 120 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random-access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2 to 8. The embodiments of the present disclosure may also be implemented by hardware or by a combination of software and hardware.

Figure 10:
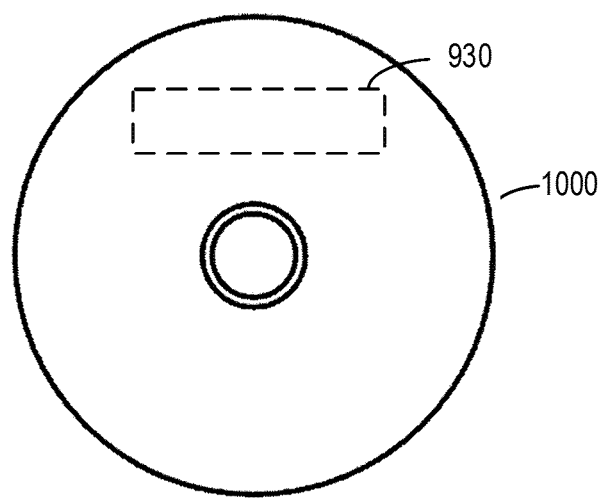
FIG. 10 illustrates a block diagram of an example computer readable medium according to some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400-500 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   the at least one memory and the program code are configured to, with the at least one processor, cause the first device to:
   start a first timer upon receiving, from a second device, configuration of a semi-persistent scheduling (SPS) for a multicast and broadcast service (MBS); and
   if the first timer expires and there is no information received to activate corresponding SPS scheduled transmissions, transmit to the second device a message indicating that the first device failed to receive the information.

2. The first device of claim 1, wherein the at least one memory and the program code are configured to, with the at least one processor, further cause the first device to:
   restart the first timer upon the transmission of the message.

3. The first device of claim 1, wherein the at least one memory and the program code are configured to, with the at least one processor, further cause the first device to:
   receive a configuration of a group-common uplink resource for a group of devices comprising the first device; and
   transmit the message to the second device via the group-common uplink resource.

4. The first device of claim 1, wherein the message is transmitted to the second device via a user equipment-specific uplink resource.

5. The first device of claim 1, wherein the at least one memory and the program code are configured to, with the at least one processor, further cause the first device to:
   increase a counter upon the transmission of the message; and
   in accordance with a determination that the counter exceeds a threshold number, perform a random-access procedure for transmitting the message.

6. The first device of claim 5, wherein the threshold number is determined based on at least one of the following:
   an indication of a maximum number from the second device, or
   the maximum number of allowed hybrid automatic repeat request, HARQ, transmissions for a transport block of the MBS scheduled by the SPS.

7. The first device of claim 1, wherein the at least one memory and the program code are configured to, with the at least one processor, further cause the first device to:
   in response to receiving the information indicating to activate the SPS, stop the first timer.

8. A method comprising:
   starting, at a first device, a first timer upon receiving, from a second device, configuration of a semi-persistent scheduling (SPS) for a multicast and broadcast service (MBS); and
   if the first timer expires and there is no information received to activate corresponding SPS scheduled transmissions, transmitting to the second device a message indicating that the first device failed to receive the information.

9. The method of claim 8, wherein the at least one memory and the program code are configured to, with the at least one processor, further cause the first device to:
   restart the first timer upon the transmission of the message.

10. The method of claim 8, wherein the at least one memory and the program code are configured to, with the at least one processor, further cause the first device to:
    receive a configuration of a group-common uplink resource for a group of devices comprising the first device; and
    transmit the message to the second device via the group-common uplink resource.

11. The method of claim 8, wherein the message is transmitted to the second device via a user equipment-specific uplink resource.

12. The method of claim 8, wherein the at least one memory and the program code are configured to, with the at least one processor, further cause the first device to:
    increase a counter upon the transmission of the message; and
    in accordance with a determination that the counter exceeds a threshold number, perform a random-access procedure for transmitting the message.

13. The method of claim 12, wherein the threshold number is determined based on at least one of the following:
    an indication of a maximum number from the second device, or
    the maximum number of allowed hybrid automatic repeat request, HARQ, transmissions for a transport block of the MBS scheduled by the SPS.

14. The method of claim 8, wherein the at least one memory and the program code are configured to, with the at least one processor, further cause the first device to:
    in response to receiving the information indicating to activate the SPS, stop the first timer.

15. A non-transitory computer readable storage medium comprising program instructions for causing an apparatus to perform at least:
    starting, at a first device, a first timer upon receiving, from a second device, configuration of a semi-persistent scheduling (SPS) for a multicast and broadcast service (MBS); and
    if the first timer expires and there is no information received to activate corresponding SPS scheduled transmissions, transmitting to the second device a message indicating that the first device failed to receive the information.

16. The non-transitory computer readable storage medium of claim 15, wherein the at least one memory and the program code are configured to, with the at least one processor, further cause the first device to:
    restart the first timer upon the transmission of the message.

17. The non-transitory computer readable storage medium of claim 15, wherein the at least one memory and the program code are configured to, with the at least one processor, further cause the first device to:
    receive a configuration of a group-common uplink resource for a group of devices comprising the first device; and
    transmit the message to the second device via the group-common uplink resource.

18. The non-transitory computer readable storage medium of claim 15, wherein the message is transmitted to the second device via a user equipment-specific uplink resource.

19. The non-transitory computer readable storage medium of claim 15, wherein the at least one memory and the program code are configured to, with the at least one processor, further cause the first device to:
   increase a counter upon the transmission of the message; and
   in accordance with a determination that the counter exceeds a threshold number, perform a random-access procedure for transmitting the message.

20. The non-transitory computer readable storage medium of claim 19, wherein the threshold number is determined based on at least one of the following:
   an indication of a maximum number from the second device, or
   the maximum number of allowed hybrid automatic repeat request, HARQ, transmissions for a transport block of the MBS scheduled by the SPS.

* * * * *